Figure 1:
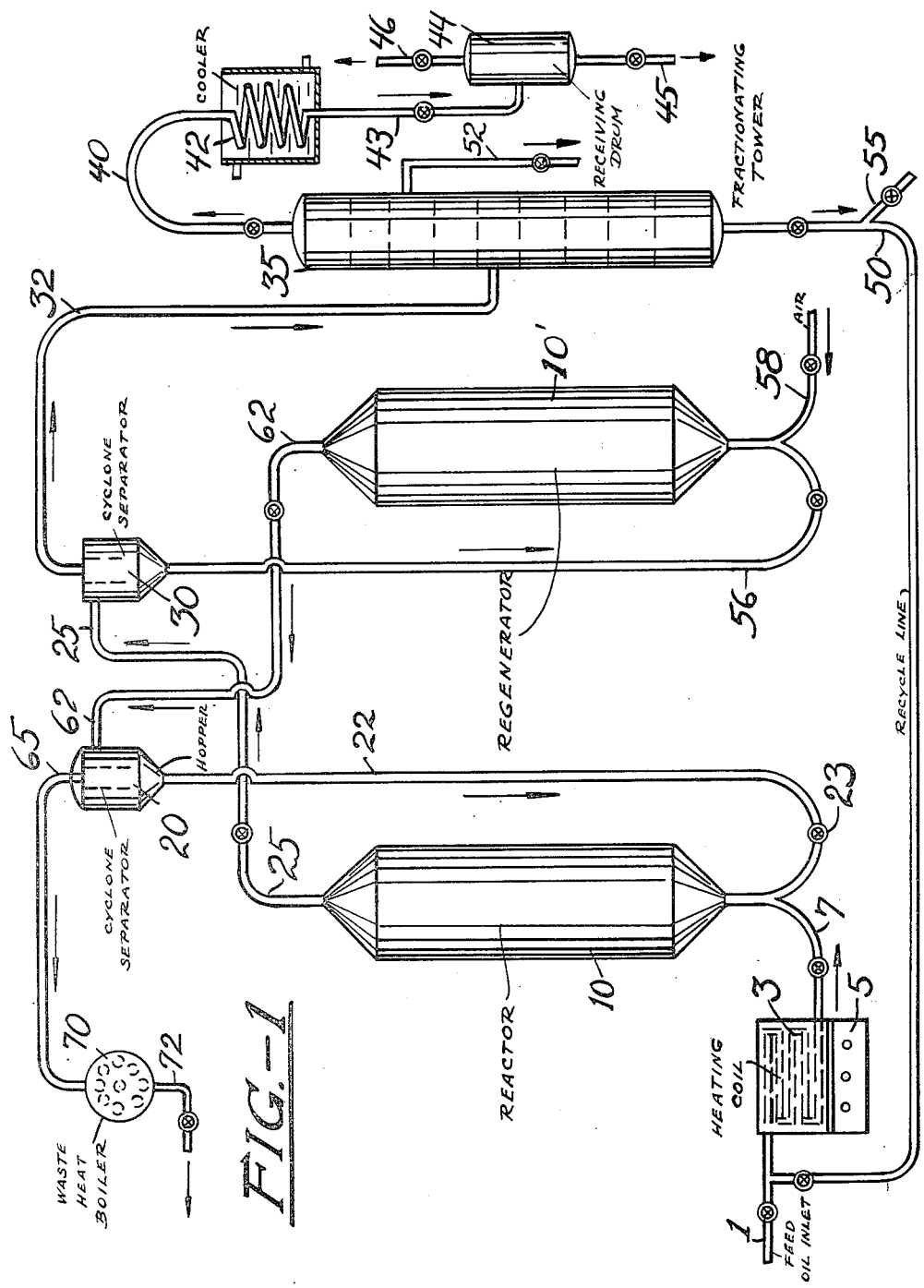

Aug. 10, 1948.    C. E. HEMMINGER    2,446,925
CRACKING OF HYDROCARBONS WITH SUSPENDED CATALYST
Filed July 5, 1941    2 Sheets-Sheet 1

Charles E. Hemminger Inventor
By ◌◌◌ Young Attorney

Patented Aug. 10, 1948

2,446,925

UNITED STATES PATENT OFFICE 2,446,925

CRACKING OF HYDROCARBONS WITH SUSPENDED CATALYST

Charles E. Hemminger, Westfield, N. J., assignor to Standard Oil Development Company, a corporation of Delaware Application July 5, 1941, Serial No. 401,183

1 Claim. (Cl. 196—52)

The present invention relates to the art of treating hydrocarbons, and more particularly it relates to a method of controlling temperatures in the vapor phase catalytic conversion of hydrocarbons in a process in which the conversion is carried out in a reaction zone containing powdered catalyst suspended in reaction vapors.

In the type of operation to which the present invention relates hydrocarbons at reaction temperatures are discharged into a reaction zone, together with powdered catalyst, such as acid treated clay, various synthetic gels, and the like, the major portion of the powder preferably having a particle size of from 200–400 mesh. Following a residence in the reaction zone for a period of time necessary to induce the desired reaction, the suspension of reaction vapors containing catalyst is withdrawn from the reaction zone, the catalyst which has become contaminated in the reaction zone is separated from the vapors and regenerated while in suspension in free oxygen-containing gas in the regeneration zone and after withdrawal of the vapors from the regeneration zone and separation of the catalyst from the flue gas formed during the regeneration by combustion of the catalyst contaminants, the regenerated catalyst is recycled to the reaction zone. The complete process, that is to say, the cracking of the hydrocarbon oils and the regeneration of catalyst involves two distinct types of reactions, namely, the first is endothermic and the second is exothermic, and both require accurate heat control both as to temperatures and time of exposure to such temperatures for best results. In the case of cracking phase, the temperatures should be higher in the zones where the catalyst is partially inactivated by prior contact with hydrocarbon vapors, and the oil is partially cracked, leaving the uncracked portion more refractory than the original oil, and the temperature should be lower where the fresh or unused catalyst is mixed with the untreated oil in order to obtain a lower percentage of coke, normally gaseous hydrocarbons and a better overall product distribution. In the regeneration phase, the regeneration of the catalyst by combustion of the carbonaceous deposits on the catalyst may result in baking and fusing of the catalyst if the temperatures exceed 1050°–1150° F. and, consequently, the temperature conditions in the regenerator must be carefully controlled.

In the present invention, I have devised means for controlling the temperature in both the reaction zone and the regeneration zone, and in brief compass, these means may consist of temperature-controlling tubes through which a fluid is continuously passed at the proper temperature and in the proper amount to effect desired heating or cooling, as the case may be.

Figure 2:
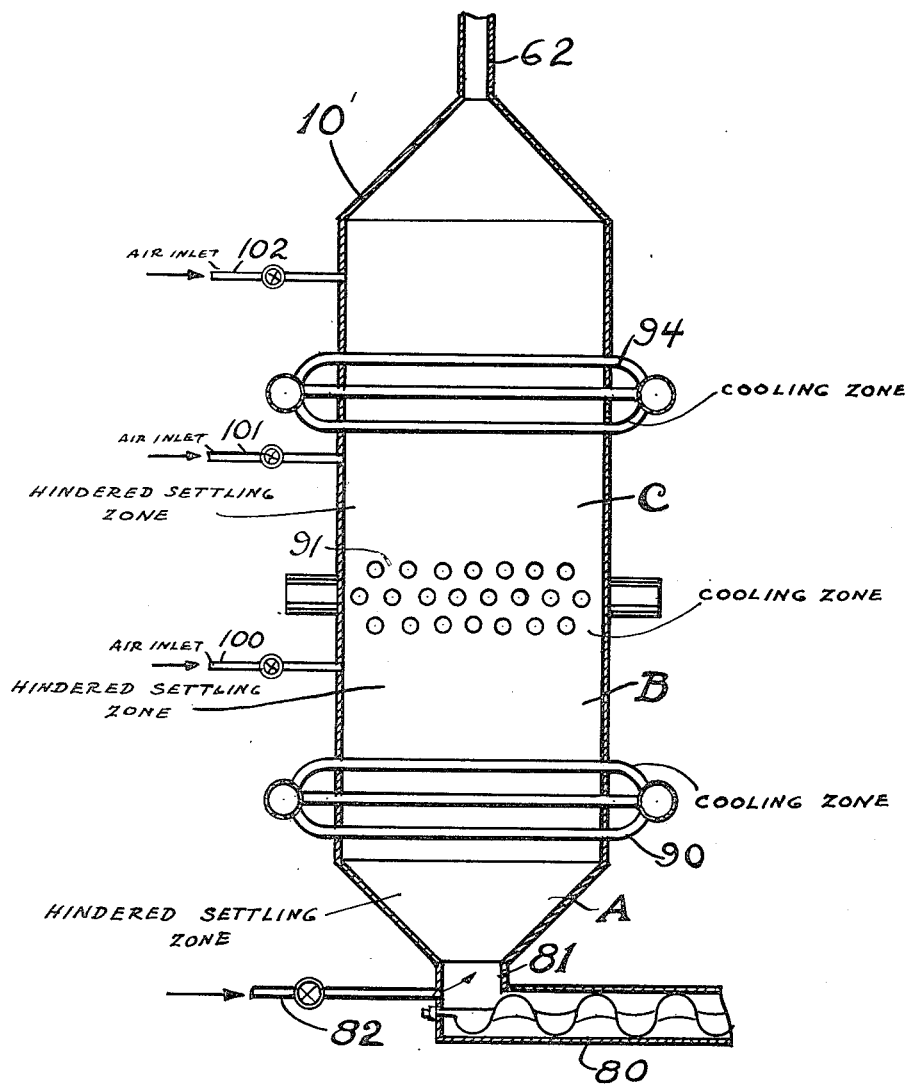

A better understanding of my invention will be had by reference to the accompanying drawings which show in Fig. 1, essentially diagrammatically a reactor and a regenerator with such accessory apparatus as is necessary that my invention may be performed, and Fig. 2 is an enlarged view of the reactor shown in Fig. 1 and is also similar in structural details to the regenerator.

I shall now set forth a specific example illustrating one modification of my invention as applied to cracking gas oil, with the understanding that the specific example is purely illustrative and does not impose any limitation on my invention.

Referring in detail to the drawing, in order to explain, at first, generally, the flow plan there shown, a gas oil having an A. P. I. gravity of about 25° is introduced into the system through line 1 and thence discharged into a coil 3 disposed in a furnace 5 where the oil is heated to a temperature of from 825°–1000° F. It is not necessary that the oil be completely vaporized in furnace 5 because the additional necessary heat is added in a reactor. The oil vapors, which are at pressures of about atmospheric or a few pounds in excess thereof, are withdrawn through line 7 and thence discharged into a reactor of relatively large internal diameter. Simultaneously, catalyst from a cyclone separator 20 is discharged through an elongated pipe 22 into the vapors in line 7, pipe 22 carrying a flow control valve 23. The vapors suspend or entrain the catalyst which is discharged into the bottom of reactor with them, and the suspension proceeds upwardly through the reactor, the linear velocity of the gas being somewhat greater than that of the catalyst, so that there is a "slippage" of the catalyst, that is to say, an unfulfilled tendency toward settling toward the bottom, which manifests itself in multitudinous eddy currents, criss-cross flow, and the like. The quantity of catalyst fed to the reactor and the linear velocity of the gas are such that the suspension in reactor 10 has a density of from 5–20 lbs./cu. ft., the gas has a linear velocity of from 0.5 to 5 ft./second, and the catalyst remains resident in the reaction zone for a period of from .5 to 10 minutes, depending on the type of catalyst, nature of the oil, temperature and desired conversion. Eventually, the main body of the catalyst is withdrawn overhead, suspended in the reaction vapors through line 25, and thence discharged into a cyclone separator 30 from which the vapors are separated from the catalyst, withdrawn overhead through line 32 and passed, if desired, through two or more cyclones (not shown) to separate the last portions of the catalyst. Thereafter the hydrocarbons are discharged into a fractionating column 35 from which column normally gaseous hydrocarbons and gasoline are recovered through line 40, cooled in coil 42, thence discharged into line 43 and finally into receiving drum 44 from which unstable gasoline may be recovered through line 45, while normally gaseous hydrocarbons are recovered through line 46. From the bottom of tower 35 a cycle oil may be recovered and returned to main feed line 1 through line 50. Ordinarily the cycle oil in line 50 may require treatment to remove coke-forming constituents and such treatment may involve treating with a selective solvent to produce a raffinate substantially free of aromatic hydrocarbons containing two or more benzene rings in a single nucleus. Other fractions, such as a light gas oil, may be recovered from tower 35 through line 52. If necessary, highly refractory oil may be bled from the system periodically through line 55.

Meanwhile, the catalyst recovered from cyclone separator 30 is discharged into the bottom of a regenerator 10' which, as hereinafter described, is similar in structure to reactor 10, and is forced upwardly therethrough by means of air or other free oxygen-containing gas, discharged through line 58 into catalyst supply line 56. The catalyst which is at a temperature of about 725°–1000° F., as recovered from the cyclone separator 30, may be mixed with air at ordinary temperatures, and under these conditions active combustion of the contaminants formed in the reactor 10, as a result of the cracking operation, will be consumed by combustion. Supply of catalyst and air to reactor 10' is such as to provide within the regenerator a suspension having a density of from 5–20 lbs./cu. ft. The suspension of regenerated catalyst is withdrawn overhead through line 62 from regenerator 10' and thence discharged into cyclone separator 20 where the catalyst is recovered from the flue gases and recycled through line 22 to the reactor. The flue gases are withdrawn from cyclone separator through line 65 and may, if necessary, be passed through two or more cyclone separators (not shown) to insure the complete removal of catalyst, whereupon the hot flue gases may be then passed through a waste heat boiler 70 to recover at least a portion of the sensible heat thereof for use in the present process, such as to preheat the oil in line 1 or for some other useful purpose. The cooled flue gases are then withdrawn through line 72 and may be rejected from the system, or they may be returned to line 58 to dilute the air, if it is found necessary to do so, to prevent overheating of the catalyst in the regeneration zone.

Referring now to Fig. 2, to describe the real gist of this invention, I have shown diagrammatically and in detail a form which regenerator 10' may be employed. I have shown the fouled catalyst discharging by means of a screw 80 (for simplicity) into inlet conduit 81 disposed at the bottom of regenerator into which air also is discharged. In the region of the reactor indicated by reference character A, the suspension of catalyst in air flows at such a rate that hindered settling or slippage of catalyst takes place, and this is accomplished by imparting to the air a linear velocity of 0.5–5 ft./second. I have also shown a bank of tubes 90 disposed within the reaction vessel and extending outside thereof, and in these tubes I may circulate a cooling fluid such as mercury, molten lead, gas oil, water, or any other fluid maintained at a lower temperature and adapted to receive by heat transfer, a portion of the heat released in the oxidation or burning taking place in section A of the regenerator. Due to the restricted path of the suspension about the tubes 90, the gaseous velocity is increased to 5–20 ft./second, with 10–15 ft./second preferred. The suspension passes upwardly into a second hindered settling zone where the linear velocity is again reduced to 0.5–5 ft./sec., and again the suspension passes upwardly through a cooling zone containing a second bank of tubes 91 through which a cooling medium is flowing. The amount of heat removed from each bank of tubes may be controlled by known means, such as reduction in temperature of the incoming fluid, changes in rates of flow, changes in pressure, and shutting off of part of the heat transfer surface.

In the modification shown, these tubes 91 extend in a direction of right angles to that of the tubes 90. In this second bank of tubes, the suspension is again cooled and again it passes upwardly into a third hindered settling zone C where the velocity again is lowered to 0.5–5 ft./second, and finally the suspension passes through a third bank of tubes 94 at increased velocities as before. The suspension is then withdrawn through line 62 and thereafter treated in the manner already described in connection with the description in Fig. 1. Since the rate of burning is proportional to the carbon on the catalyst, the volume of zones A, B, C, etc., may be made successively larger to give about the same amount of burning or heat release in each zone, and air may be added through pipes 100, 101, and 102.

It is deemed unnecessary to describe the construction of reactor 10 because it is substantially the same as that of regenerator 10', except that a fluid adapted to transfer heat to the hydrocarbon vapors flows in the tubes corresponding to tubes 90, 91, and 94. These tubes supply through the heating medium flowing through them the heat which has been lost or absorbed in the endothermic cracking reaction. Heretofore it has been stated that the oil entering reactor 10 may be heated as high as 1000° F. which, of course, is above vaporization temperatures for an ordinary gas oil where the pressure is about 0 lb./sq. in. gauge. It is an important feature of this invention, however, that the oil in 3 may be preheated merely to, say, 400° F. or even lower, and thence discharged into reactor 10 where it is flashed and superheated to temperatures within the cracking range, say from 800°–950° F., or higher. In that event, the furnace 5 may be dispensed with and one or more heat exchangers substituted therefor, the heat preferably being supplied by heat exchange relationship from the gases issuing from regenerator 10'. In other words, it is within the purview of my invention to provide a major portion of the heat necessary for the cracking operation in reactor 10 from the hot regenerated catalyst obtained directly from the regenerator supplemented by the hot flue gases also issuing from the regenerator and serving to preheat the oil in a preheater disposed in line 1. Of course, in this modification I make provision for adding steam from an extraneous source, if that is necessary.

Preferably the heat supplied to the lower portion of reactor 10 where fresh feed contacts catalyst is less than the amount of heat supplied in the upper portion of the reactor where the hydrocarbon vapors are most refractory. The heat may be that recovered in the fluid in regenerator 10' and transferred in the medium to 10.

It should be apparent to any one skilled in the art that such a reactor as 10 may be employed for any reaction in which heat is to be added or removed with or without regeneration of the catalyst required. Examples of processes other than cracking are dehydrogenation of hydrocarbons, aromatization, hydroforming, isomerization, etc., in which heat is added, and treating of hydrocarbons by bauxite, hydrogenation of oils, hydrogenation of CO, oxidation processes, etc., in which heat is removed by the heat transfer tubes. In these reactions positive or negative temperature gradient improves the yields and results.

Summarizing, the invention consists in a reactor which is divided into hindered settling zones by spaced tubes containing a heat transfer medium about which the suspension of powder in vapor passes with little or no slippage of particles in the gas. It is recognized that it has been proposed in the past to put heat transfer tubes in reactors and in reactors containing a suspension of powder. However, it is new to have low velocities in hindered settling zones between the sections of tubes. As a result, in regeneration of catalysts, the catalyst residence time in the reactor can be made much longer than the gas residence time in the reactor, and the reactor can be made smaller. Also, there is no mixing of the powder in the said zones so that the cooled catalyst entering the settling zone is reheated to combustion temperatures again, although cooled by a low temperature fluid. Also, the top of the hindered settling zones are cooled by radiation from the tubes and due to the mixing the whole mass is cooled at the same time. A very distinct advantage of my invention, over the conventional even spacing of the tubes throughout the length of the reactor and regenerator, is that a greater temperature difference between the tubes and the powder can be maintained because of the mixing in my hindered settling zones between the banks of tubes. The velocity in the latter must be less than 5 ft./second to achieve the mixing effect. The "hindered settling" referred to herein, means that the gas velocity is sufficiently low that the concentration of solids in the suspension is not markedly affected by the inlet concentration in the vapors. Thus, for example, at 6 ft./second velocity in the reactor doubling the feed rate of the powder, the concentration in the reactor is at least doubled. However, at 2 ft./second, doubling the powder feed rate increases the reactor concentration by only 10–20%. These velocities vary with the size and density of the solid, viscosity of gases, etc., the important consideration being that this type of hindered settling exists between the heat transfer tubes.

Many modifications of my invention will suggest themselves to those familiar with this particular art.

What I claim is:

A method of catalytically cracking hydrocarbons which comprises suspending powdered catalyst in hydrocarbon vapors, passing the suspension with an initial vapor velocity of less than 5 ft. per second upwardly in a reaction zone through a plurality of spaced heating zones disposed in said reaction zone, said heating zones being separated by unobstructed zones and arranged in such a manner that the velocity of the vapors within said heating zones rises above 5 ft. per second and drops again in said unobstructed zones below 5 ft. per second, withdrawing cracked products and fouled catalyst from said reaction zone, separating the fouled catalyst from the cracked products, suspending the separated catalyst in a regenerating gas and passing the suspension with an initial gas velocity of less than 5 ft. per second through a plurality of spaced cooling zones disposed in said regeneration zone, said cooling zones being separated by unobstructed zones, adding additional regenerating gas between the said cooling zones to the suspension in order to increase the rate of burning of the carbonaceous matter remaining on the catalyst, separating regenerated catalyst from the regeneration gases and recycling the regenerated catalyst to said reaction zone, said heating and cooling zones being arranged in such a manner that the velocity of the vapors and gas in said unobstructed zones is less than 5 ft. per second and that in the heating and cooling zones above 5 ft. per second, whereby hindered settling and thorough mixing of the catalyst and vapors in said unobstructed zones in said reaction zone and of the catalyst and gas in said unobstructed zones in said regeneration zone occur.

CHARLES E. HEMMINGER.

REFERENCES CITED

The following references are of record in the file of this patent:

UNITED STATES PATENTS

| Number | Name | Date |
|---|---|---|
| 1,799,757 | Miller | Apr. 7, 1931 |
| 1,873,783 | Osterstrom et al. | Aug. 23, 1932 |
| 2,078,947 | Houdry et al. | May 4, 1937 |
| 2,143,949 | Keith | Jan. 17, 1939 |
| 2,231,231 | Subkow | Feb. 11, 1941 |
| 2,248,196 | Plummer | July 8, 1941 |
| 2,273,076 | Voorhees | Feb. 17, 1942 |
| 2,288,613 | Dill | July 7, 1942 |
| 2,303,680 | Brueckmann | Dec. 1, 1942 |
| 2,311,984 | Guild | Feb. 23, 1943 |
| 2,312,445 | Ruthruff | Mar. 2, 1943 |
| 2,320,273 | Gohr et al. | May 25, 1943 |
| 2,320,562 | Bransky | June 1, 1943 |
| 2,326,705 | Thiele et al. | Aug. 10, 1943 |

OTHER REFERENCES

Badger and McCabe, "Elements of Chemical Engineering," page 176, second edition, copyright 1936 by McGraw-Hill Book Co., New York.